Patented May 5, 1953

2,637,745

UNITED STATES PATENT OFFICE 2,637,745

HALOGENATED ARYL ALICYCLIC CARBOXYLIC ACIDS AND THEIR SALTS AND PROCESSES OF MANUFACTURING THE SAME

Erwin Schwenk, Montclair, N. J., and Domenick Papa, Brooklyn, N. Y., assignors, by mesne assignments, to Schering International Research Institute, Bloomfield, N. J., a corporation of New Jersey No Drawing. Application April 19, 1948, Serial No. 21,853

14 Claims. (Cl. 260—520)

The present invention relates to the manufacture of halogenated aryl alicyclic alkene and alkane carboxylic acids and their metal and amine salts.

It is a general object of the invention to produce halogenated compounds having useful chemotherapeutic properties. Other objects of the invention will appear as the more detailed description thereof appears.

We have found that in general the $\Delta^1$-cycloalkene substituted acetic acid and the homologous acids and the corresponding isomeric cycloalkylidene carboxylic acids, having in the $\alpha$-position to the carboxylic group either a methylene radical or the group =CH— (in the case of acetic acid), for example cyclohexenyl, cyclohexylidene, cyclopentenyl, cyclopentylidene, dihydronaphthyl and analogous acetic acids, and likewise the members of the acetic acid series substituted by terpene or terpene-like radicals having a double bond connected to the nuclear carbon linked to the acid group, can be condensed with a hydroxy aldehyde wherein the double bond of the aldehyde group forms part of a conjugated double bond system, the phenyl nucleus containing or being free from halogen atoms, to form dicyclic alkene carboxylic acids which may be subsequently saturated in the alkene chain and in the cycloalkene ring; and these products are treated with halogenating agents if none of the starting compounds contained halogen. Among the starting aldehydes may be mentioned hydroxy - benzaldehydes, hydroxy-iodo-benzaldehydes, hydroxybromo-benzaldehydes, hydroxychloro-benzaldehydes, and the corresponding cinnamaldehydes.

As just indicated, the compounds of the present invention may be produced either by the halogenation of the aryl alicyclic alkene and alkane carboxylic acids having a hydroxyl-substituted benzene radical, or by forming the dicyclic compounds from starting compounds which already contain halogen. In the first procedure compounds which may be produced in accordance with the process described in our copending application entitled "Aryl-Alicyclic Carboxylic Acids and Process for Their Manufacture," Serial No. 544,831, filed July 13, 1944, are subjected to a known halogenation treatment. In proceeding in accordance with the second mode of manufacture, halogenated aromatic aldehydes, for example 3,5-diiodo-4-hydroxy-benzaldehyde, or the corresponding cinnamaldehyde, may be condensed with cycloalkene carboxylic acids or the corresponding cycloalkylidene carboxylic acids (in the form of their alkali metal salts).

Thus in making the compounds of the invention by the first-mentioned procedure, p-hydroxybenzaldehyde may, for example, be condensed by the Perkin reaction, or by modifications of the Perkin reaction, with a salt of cyclohexenyl acetic acid, such as the potassium or sodium salt, under anhydrous conditions in the presence of acetic anhydride, or in the form of the free acid and with the aid of a catalyst, for example, a tertiary amine like triethyl or tributyl amine, and the resulting $\alpha$-($\Delta^1$-cyclohexenyl)-p-hydroxycinnamic acid may then be carefully hydrogenated, as by means of hydrogen and Raney nickel catalyst, and thereafter iodinated by known reagents to yield $\alpha$-cyclohexy-$\beta$-(3,5-diiodo-4-hydroxyphenyl)propionic acid according to the following equation:

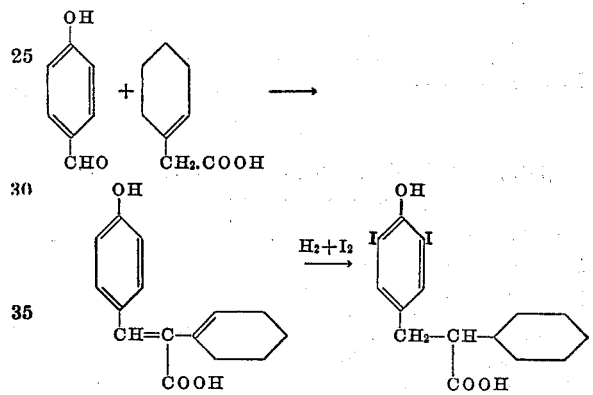

In the alternative procedure, by employing, for example, 3,5-diiodo-4-hydroxybenzaldehyde as one of the starting materials, the compound

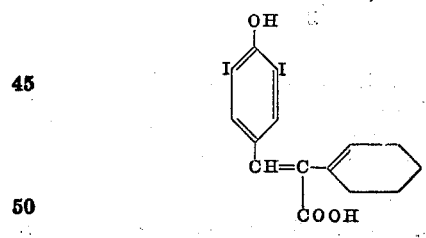

can be readily obtained. Cautious hydrogenation of this compound will yield the same product as mentioned above.

Analogous compounds are produced by employing other aldehydes such as 2,4,6-triiodo-5-hydroxybenzaldehyde, 3,5 - dichloro-4-hydroxybenzaldehyde and the corresponding derivatives of cinnamaldehyde and higher aromatic aldehydes wherein the double bond of the aldehyde group is part of a conjugated double bond system.

The invention will be further described with the aid of the following examples which are presented only for purposes of illustration:

EXAMPLE I

α-(Δ¹ - cyclohexenyl) 3,5 - diiodo-4-hydroxycinnamic acid

A mixture of 17.9 g. of anhydrous potassium cyclohexylidene acetate, 37.4 g. of 3,5-diiodo-4-hydroxybenzaldehyde and 100 cc. of acetic anhydride is heated for 20–30 hours at 105–110° C. The condensation is run under anhydrous conditions. After the reaction mixture has cooled to about 60° C. the excess acetic anhydride is decomposed cautiously with water and the reaction mixture poured on ice. The semi-solid residue is extracted with ether and the acidic fraction isolated by means of sodium carbonate extraction. The sodium carbonate extracts are freed of ether, cooled and acidified to Congo red paper with HCl. The pale yellow precipitate is then recrystallized from a mixture of water and acetone and the substituted cinnamic acid is obtained in the form of a very pale yellow solid, melting at 212° C. with decomposition.

EXAMPLE II

α-(Δ¹-cyclohexenyl) 3-iodocinnamic acid 12 g. of 3-iodobenzaldehyde and 9 g. of anhydrous potassium cyclohexylideneacetate are condensed in acetic anhydride as described in Example I. After working up the reaction mixture, the iodinated acid is obtained from acetone-water mixture as a pale yellow solid melting at 169–170° C. This condensation can also be effected by using the isomeric potassium Δ¹-cyclohexenylacetate.

EXAMPLE III

β-(3,5-diiodo-4-hydroxyphenyl) α-cyclohexylpropionic acid

This acid is prepared by first condensing p-hydroxybenzaldehyde and anhydrous potassium cyclohexylideneacetate in acetic anhydride. The resulting α(Δ¹-cyclohexenyl)-4-hydroxycinnamic acid is reduced by any of the standard methods, and the hydrogenated compound iodinated as follows: To 0.1 m. (24 g.) of this hydrogenated acid dissolved in 800 cc. of $$\frac{N}{2}$$

sodium hydroxide there is added a solution of 50.8 g. of iodine and 50.8 g. of KI dissolved in 250 cc. of water. The iodination reaction mixture is allowed to stand for one-half hour and then treated with sodium bisulfite solution. On acidification with concentrated HCl, the β(3,5-diiodo-4-hydroxyphenyl) α-cyclohexylpropionic acid is obtained in a yield of 50 g., melting at 145–146° C. Recrystallization from acetone and water gives a product melting at 155–156° C.

EXAMPLE IV

β-(3,5-diiodo-4-hydroxyphenyl)-α-cyclopentylpropionic acid 23.4 g. (0.1 m.) of α-(cyclopentyl)-β-(p-hydroxyphenyl)propionic acid is iodinated as described in Example III. The β-(3,5-diiodo-4-hydroxyphenyl)-α-cyclopentylpropionic acid is obtained in the form of a white crystalline powder which on recrystallization from acetone-water mixture melts at 131–132° C.

EXAMPLE V

In similar fashion, α-(3,4-dihydro-6-methoxy-(α)-naphthyl)-3,5-diiodo-4-hydroxycinnamic acid is obtained by reacting the potassium salt of 3,4-dihydro-6-methoxy-(α)-naphthylacetic acid with 3,5-diiodo-4-hydroxybenzaldehyde in the presence of acetic anhydride. The product is isolated as described in Example I and after recrystallization from chloroform-petroleum ether melts at 112–114° C. with decomposition.

EXAMPLE VI

The syntheses as outlined in Examples I to V can be modified to avoid the use of the anhydrous alkali salts. This modification uses the free acid, cyclohexenyl, cyclopentenyl, and other alicyclic acetic acids with the appropriate aromatic aldehyde together with suitable catalysts, i. e., triethyl amine, anhydrous sodium or potassium acetate, anhydrous potassium carbonate, etc.

28 g. (0.2 m.) of cycloexenylacetic acid, 24.4 g. (0.2 m.) of p-hydroxybenzaldehyde, 20.2 g. (0.2 m.) of triethylamine and 61.2 g. (0.6 m.) of acetic anhydride are heated for 10–12 hours at 100–120° C. The reaction mixture is worked up as described above, yielding α-(Δ¹-cyclohexenyl)-4-hydroxycinnamic acid which is then iodinated to the 3,5-diiodo-4-hydroxy compound.

The corresponding aliphatically saturated compound of the formula

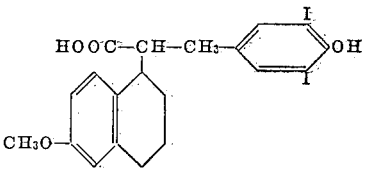

α-(6-methoxy)-(α)-tetralyl)-β-(3,5-diiodo-4-hydroxyphenyl)-propionic acid can be prepared by first reacting anhydrous potassium 3,4-dihydro-6-methoxy α-naphthyl acetate with 4-hydroxybenzaldehyde, followed by hydrogenation of the alicyclic ring and of the aliphatic chain, after which the intermediate is subjected to iodination.

In similar fashion, by the following series of reactions: α-(3-isopropyl-6-methyl-Δ¹-cyclohexenyl)-3,5-diiodo-4-hydroxycinnamic acid (I) and α-(3-isopropyl-6-methylcyclohexyl)-β-(3,5-diiodo-4-hydroxyphenyl) propionic acid (II) can be prepared from the corresponding terpene compounds and diiodo-hydroxy- and hydroxybenzaldehyde respectively:

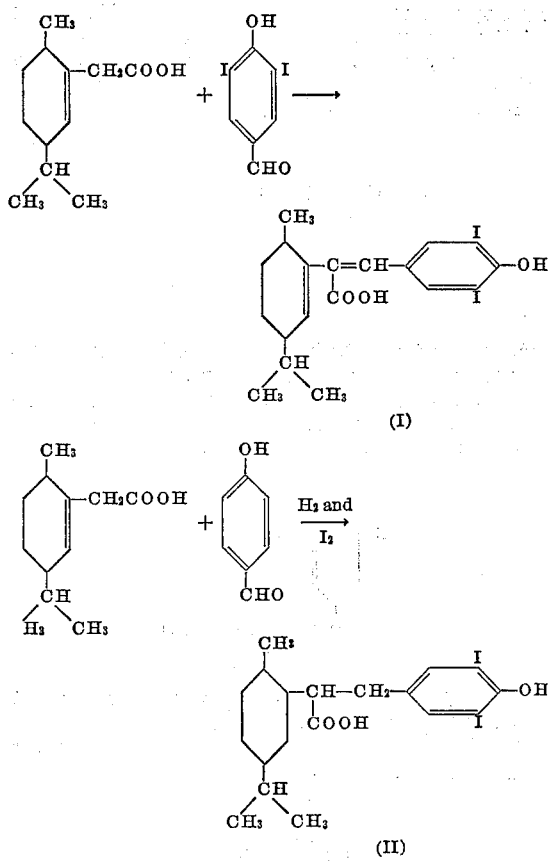

EXAMPLE VII

α-cyclohexyl-β-(3,5-dibromo-4-hydroxyphenyl)-propionic acid

To a solution of 0.1 m. of α-cyclohexyl-β-(p-hydroxyphenyl)propionic acid in 150 cc. of acetic acid there is added dropwise with stirring, a solution of 16 g. of bromine in 50 cc. of acetic acid. The reaction mixture is allowed to stand overnight, then diluted with water, and the crude dibromo acid filtered or isolated by ether extraction. Recrystallization from aqueous ethanol leaves the dibromo acid as a white crystalline solid melting at 158–160° C.

EXAMPLE VIII

α-Cyclohexyl-β-(3,5-dichloro-4-hydroxyphenyl)-propionic acid

This compound is prepared in accordance with the instructions of Example VII, except that 7.1 g. of chlorine dissolved in 100 cc. of acetic acid is substituted for the bromine solution. The dichloro acid after recrystallization from aqueous ethanol melts at 173.5–174.5° C.

EXAMPLE IX

α-(Δ¹-cyclohexenyl)-3,5-dichloro-4-hydroxycinnamic acid

A mixture of 0.1 m. of cyclohexanol-1-acetic acid, 0.1 m. of 3,5-dichloro-4-hydroxybenzaldehyde, 0.3 m. of anhydrous triethylamine and 150 cc. of acetic anhydride is heated for 72 hours at 105–110° C. The reaction mixture is then worked up as described with the corresponding diiodo compound and purified by recrystallization from benzene-petroleum ether, melting point 194–195° C.

EXAMPLE X

α-(Δ¹-cyclohexenyl)-3-chloro-4-hydroxycinnamic acid

By substantituting 3-chloro-4-hydroxybenzaldehyde for the dichloro-aldehyde of the previous example, there may be obtained the monochloro derivative which is purified by recrystallization from aqueous ethanol.

EXAMPLE XI

α-Cyclopentyl-β-(3,5-dibromo-4-hydroxyphenyl)propionic acid

α-Cyclopentyl-β-(p-hydroxyphenyl)propionic acid is brominated exactly as described for the homologous cyclohexyl compound. It may be recrystallized from aqueous alcohol or a mixture of chloroform and petroleum ether.

The condensation products above described may be prepared in the form of various salts, such as the sodium, potassium, calcium, magnesium and other metal salts, by the conventional methods of neutralization or double decomposition. The amine salts, such as the diethyl amino ethanol salt, the mono-, di-, and triethanol amine salts and likewise the salts of other non-toxic amines can be prepared by combining equimolecular proportions of the substances in suitable solution followed by precipitation or crystallization.

The compounds of the invention possess bactericidal and amebicidal properties and are particularly useful in the treatment of amebic infections of the alimentary tract as their bactericidal properties aid in alleviating the secondary bacterial infections which are a common concomitant of amebiasis. The iodine-containing compounds of the invention are also useful as X-ray contrast agents, and they are particularly valuable for oral administration for cholecystographic examination. They are substantially less toxic than the contrast agents heretofore available for X-ray examination of the gall bladder and they have the additional advantage that their bactericidal activity is useful in combating infections of the gall bladder so that they possess a double utility when employed as contrast agents.

In the specification and claims the terms "halogen" and "halogenated" are intended to denote chlorine, bromine and iodine.

This application is a continuation-in-part of our application Serial No. 544,832, filed July 13, 1944, and contains subject matter in common with our applications Serial No. 629,916, filed November 20, 1945, Serial No. 722,084, filed January 14, 1947, and Serial No. 784,310, filed November 5, 1947.

We claim:

1. A member of the group consisting of acids of the formula

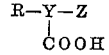

and their non-toxic salts, R being an alicyclic radical having from 5 to 6 carbon atoms in the ring, Z being an m-halogeno-p-hydroxy-phenyl radical, the halogen being selected from the group consisting of chlorine, bromine and iodine, and Y being a saturated aliphatic chain of 2 carbon atoms, to different carbons of which the radicals R and Z are directly attached, the carboxylic group being attached to the same carbon as the alicyclic group.

2. α-Alicyclic β-(3,5-diiodo-4-hydroxy-phenyl) propionic acids, the alicyclic ring having from 5 to 6 carbon atoms.

3. α-Cyclohexyl-β-(3,5-dibromo-4-hydroxyphenyl) propionic acid.

4. α-Cyclohexyl-β-(3,5-dichloro-4-hydroxyphenyl) propionic acid.

5. α-Cyclohexyl-β-(3,5-diiodo-4-hydroxyphenyl) propionic acid.

6. Process for the manufacture of dicyclically substituted aliphatic carboxylic acids, which comprises heating and condensing a member of the group consisting of alicyclically substituted acetic acids and their salts, wherein the 1-carbon of the alicyclic ring has a double bond connected thereto, and wherein the alicyclic ring has from 5 to 6 carbon atoms, with a p-hydroxybenzene aldehyde under susbtantially anhydrous conditions and in the presence of the anhydride of a lower fatty acid to produce an alicyclically and aromatically substituted alkene carboxylic acid, hydrogenating the non-benzenoid double bonds of the condensation product, and reacting the resulting product with a halogenating agent to introduce halogen into the aromatic ring.

7. Process for the manufacture of dicyclically substituted aliphatic carboxylic acids which comprises heating and condensing a salt of cyclohexylidene acetic acid, with a p-hydroxybenzene aldehyde under substantially anhydrous conditions and in the presence of the anhydride of a lower fatty acid to produce an alicyclically and aromatically substituted alkene carboxylic acid, hydrogenating the non-benzenoid double bonds of the condensation product, and reacting the resulting product with a halogenating agent to introduce halogen into the aromatic ring.

8. Process for the manufacture of dicyclically substituted aliphatic carboxylic acids, which comprises heating and condensing a member of the group consisting of alicyclically substituted acetic acids and their salts, wherein the 1-carbon of the alicyclic ring has a double bond connected thereto, and wherein the alicyclic ring has from 5 to 6 carbon atoms, with a p-hydroxybenzene aldehyde under substantially anhydrous conditions and in the presence of the anhydride of a lower fatty acid to produce an alicyclically and aromatically substituted alkene carboxylic acid, hydrogenating the non-benzenoid double bonds of the condensation product, and reacting the resulting product with an iodinating agent to introduce iodine into the aromatic ring.

9. Process for the manufacture of dicyclically substituted aliphatic carboxylic acids which comprises heating and condensing a salt of cyclohexylidene acetic acid, with a p-hydroxybenzene aldehyde under substantially anhydrous conditions and in the presence of the anhydride of a lower fatty acid to produce an alicyclically and aromatically substituted alkene carboxylic acid, hydrogenating the non-benzenoid double bonds of the condensation product, and reacting the resulting product with an iodinating agent to introduce iodine into the aromatic ring.

10. Compounds of the formula

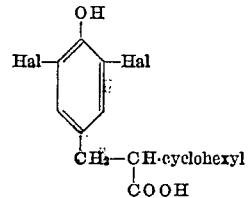

wherein Hal is a halogen of atomic number not less than 17 and not more than 53.

11. α-Cyclopentyl-β-(3,5-diiodo-4-hydroxyphenyl) propionic acid.

12. Compounds of the formula

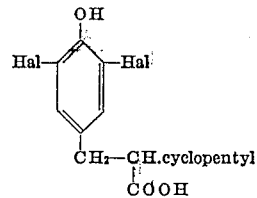

wherein Hal is a halogen of atomic number not less than 17 and not more than 53.

13. A member of the group consisting of acids of the formula

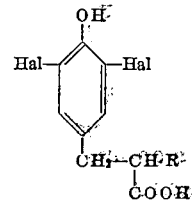

wherein Hal is a halogen of atomic number not less than 17 and not more than 53 and R is an alicyclic radical having from 5 to 6 carbon atoms in the ring, and the non-toxic salts thereof.

14. α-Cyclopentyl-β-(3,5-dibromo-4-hydroxyphenyl) propionic acid.

ERWIN SCHWENK.
DOMENICK PAPA.

References Cited in the file of this patent
UNITED STATES PATENTS

| Number | Name | Date |
|---|---|---|
| 2,487,075 | Schwenk et al. | Nov. 8, 1949 |
| 2,496,064 | Natelson et al. | Jan. 31, 1950 |
| 2,529,518 | Schwenk et al. | Nov. 14, 1950 |